UNITED STATES PATENT OFFICE.

CHARLES BRANWHITE, OF NEW YORK, N. Y.

IMPROVEMENT IN COMPOSITIONS FOR MAKING HANDLES, MOLDS, &c.

Specification forming part of Letters Patent No. 4,362, dated January 23, 1846.

*To all whom it may concern:*

Be it known that I, CHARLES BRANWHITE, of the city, county, and State of New York, have invented a new and useful vegetable composition not known or used before in the making or manufacturing of molds, heads, or handles of any kind, which composition is made of the following ingredients:

Take half a pound of starch and dilute it in one pint of cold water. Then put one quart of water in a gallon open vessel and let it boil. Then pour the diluted starch into the vessel, and when it again boils add three pounds of rye-flour and stir it well while on the fire until the whole is well mixed together. When this mixture is cold take it out of the vessel and place it on a flat surface. Now take finely-sifted dry mahogany sawdust (or finely-sifted wood-ashes, or whitening may be used) and stiffen the dough to the consistency of good putty by working the whole together well with the hands. The composition is now ready for use.

What I claim as my invention, and desire to secure by Letters Patent, is—

The before-described vegetable composition for the purpose of making molds, heads, and handles of every description, especially in the making of fringe and tassel molds, parasol and umbrella handles or heads.

In witness whereof I have hereunto subscribed my name.

CHARLES BRANWHITE.

Witnesses:
WM. C. R. ENGLISH,
W. S. GUMBS.